Sept. 28, 1965 C. C. RAYBURN 3,208,589

APPARATUS FOR HANDLING AND TRANSPORTING ARTICLES

Filed March 31, 1961 3 Sheets-Sheet 1

INVENTOR.
Charles C. Rayburn
BY
Robert S. Silver

APPARATUS FOR HANDLING AND TRANSPORTING ARTICLES

Filed March 31, 1961 3 Sheets-Sheet 2

INVENTOR.
Charles C. Rayburn
BY
Robert D. Silver

APPARATUS FOR HANDLING AND TRANSPORTING ARTICLES

Filed March 31, 1961 3 Sheets-Sheet 3

INVENTOR.
Charles C. Rayburn
BY
Robert S. Silver

United States Patent Office 3,208,589
Patented Sept. 28, 1965

3,208,589
APPARATUS FOR HANDLING AND TRANSPORTING ARTICLES

Charles C. Rayburn, Alexandria, Va., assignor to Illinois Tool Works Inc., a corporation of Delaware Filed Mar. 31, 1961, Ser. No. 99,782
2 Claims. (Cl. 206—65)

The invention relates in general to a method and apparatus for handling and transporting articles and more particularly relates to a method and apparatus for loading, feeding, and transporting waferlike articles in planar oriented array.

It is necessary in many manufacturing processes to handle a large number of discrete articles by mechanical means. The key problems in most processes of this nature are prevention of mechanical damage to the articles, prevention of contamination of the articles, a high degree of precision, and automatic handling in a trouble free fast repetitive manner. Particular problems are encountered in handling articles, particularly electronic components, which are of miniature, sub-miniature, or microsize. The system employed by a manufacturer must not only be feasible, but have sufficient production capability, a high reliability, a high degree of versatility, and a low cost. While this invention shall be described in terms of apparatus and methods for handling micro-sized waferlike elements, it is to be remembered that this system is adaptable for larger and diverse products.

In recent years the growing complexity of the electronics art has given rise to a number of new techniques for the rapid fabrication of circuits. Among these may be mentioned printed circuitry wherein an assemblage of conductors is formed on an insulating member by any one of a number of known methods and electrical components are secured to the surface in bridging relationship to the gap left in the conductors whereby a circuit is established. The modular technique has also been developed as a preferred form of circuit miniaturization. One type of modular group consists of a series of ceramic wafers arranged in parallel spaced array and held fixed by means of conductor wires lying in notches formed in the edges of the members and soldered thereto.

The individual wafers forming the modular group may be manufactured at one site, and then may be assembled at a second and distant site. Means for transporting and handling these waferlike elements must be provided. The original manufacturer of the wafer, in addition to making the wafer per se, may perform a number of subsequent operations on the wafers prior to the wafers being assembled into a modular group. For example, the original manufacturer, or some subsequent processor, may perform the additional processing of putting various configured printed circuitries on the wafers, mounting components such as resistors, capacitors, transistors, etc. on the wafers, tinning the riser wire notches on the wafers, and/or thermoplastic precoating the wafer prior to its assembly by the second manufacturer. Various testing operations may be performed relative to the various stages of processing by either or both manufacturers.

When it is considered that a square wafer may have eight possible orientations thereof, the problem of loading and feeding wafers such that any one of the eight orientations may be selectively and quickly varied at will is difficult. This problem becomes magnified when the individual wafers have a small absolute size and have relatively bulky components such as resistors, capacitors, transistors, transformer coils, and the like mounted thereon so that they project from the planar surfaces of the wafer.

This invention is directed toward solving the problems associated with handling, feeding, discharging, and transporting discrete individual waferlike articles which have certain uniform dimensions but are not necessarily uniform articles.

It is the general object of this invention to provide a method and apparatus for precise mechanized control of individual precisely made delicate components for handling and storage purposes.

A further object of this invention is to provide a method and apparatus of the aforenoted type, which is particularly well adapted for use with miniature articles such as wafers having a square configuration and measuring under ⅓ of an inch on a side.

It is the further object of this invention to provide a method and apparatus for automatically controlling each discrete article during the loading and feeding operations which affords stoppage of loading or feeding at any point during the operation and resumption at any later time as suitable and desired.

A further object of this invention is to provide method and apparatus as above described wherein the control of the magazine during feeding and loading operations is work dependent rather than time dependent.

It is a further object of this invention to provide a method and apparatus for aligning a plurality of waferlike elements in planar array in a magazine wherein a plurality of elements may be fed or discharged simultaneously while maintaining individual control over the elements.

It is a further object of this invention to provide a method and apparatus for discharging waferlike elements which are oriented in planar array within a magazine in any of the elements' eight possible orientations.

It is another object of this invention to provide a method and apparatus as aforedescribed which is well adapted for but not limited to being programmed by various computer-type controls now generally available in the art.

Still another object of this invention is to provide a novel method of manipulating a magazine so as to provide discharge of waferlike elements in any one of their eight possible positions.

Still another object of the invention is to provide a multiple use magazine which provides the multiple functions of providing a package for transporting articles contained therewithin, storage of articles, affords a partial release of the articles, provides an easy loading thereof, and provides an easy discharge of the articles therefrom in any desired orientation.

A further object of the invention is to provide a magazine which compartmentalizes each individual article so that one article does not normally contact another article during any of the stages of loading, storage, transporting, and discharge from the magazine.

Another object of the invention is to provide a magazine which is composed of two identical halves which are nestable together in right angle mirror image relationship to trap the articles therebetween.

A further object of the invention is to provide identification means on the magazine which serves the dual function of retaining the two halves of the magazine together as well as describing the articles contained within the magazine and the initial orientation thereof.

A further object of the invention is to provide a magazine which accommodates nonsymmetrical individual components.

A further object of the invention is to provide a novel magazine having the above described characteristics which affords the packaging of different components of the same general but non-identical configuration within the same magazine.

A still further object of this invention is to provide a package of magazines which interfit together in interlocking relationship for shipping a plurality of magazines and for storing of same in a compact manner.

Another object of the invention is to provide a one piece molded magazine half which has a plurality of article supporting troughs on one surface and a plurality of sinusoidal alternate grooves and ridges on an opposite surface, both of said surfaces being adapted to provide interfitting interlocking engagement with other identical members in mirror image relationship.

Still another object of the invention is to provide a magazine member which is a unitary molded article having no moving parts, is adapted for use and handling by automatic machinery, may be manufactured at low cost, may be made in any desirable modular size, and is otherwise well adapted for the purposes for which it is designed.

The novel features that are characteristic of the invention are set forth with particularity in the appended claims. The invention itself, however, both as to its organization and its method of operation, together with additional objects and advantages thereof, will best be understood by the following description of specific embodiments when read in connection with the accompanying drawings in which:

Figures 6, 6A, 7, 7A:
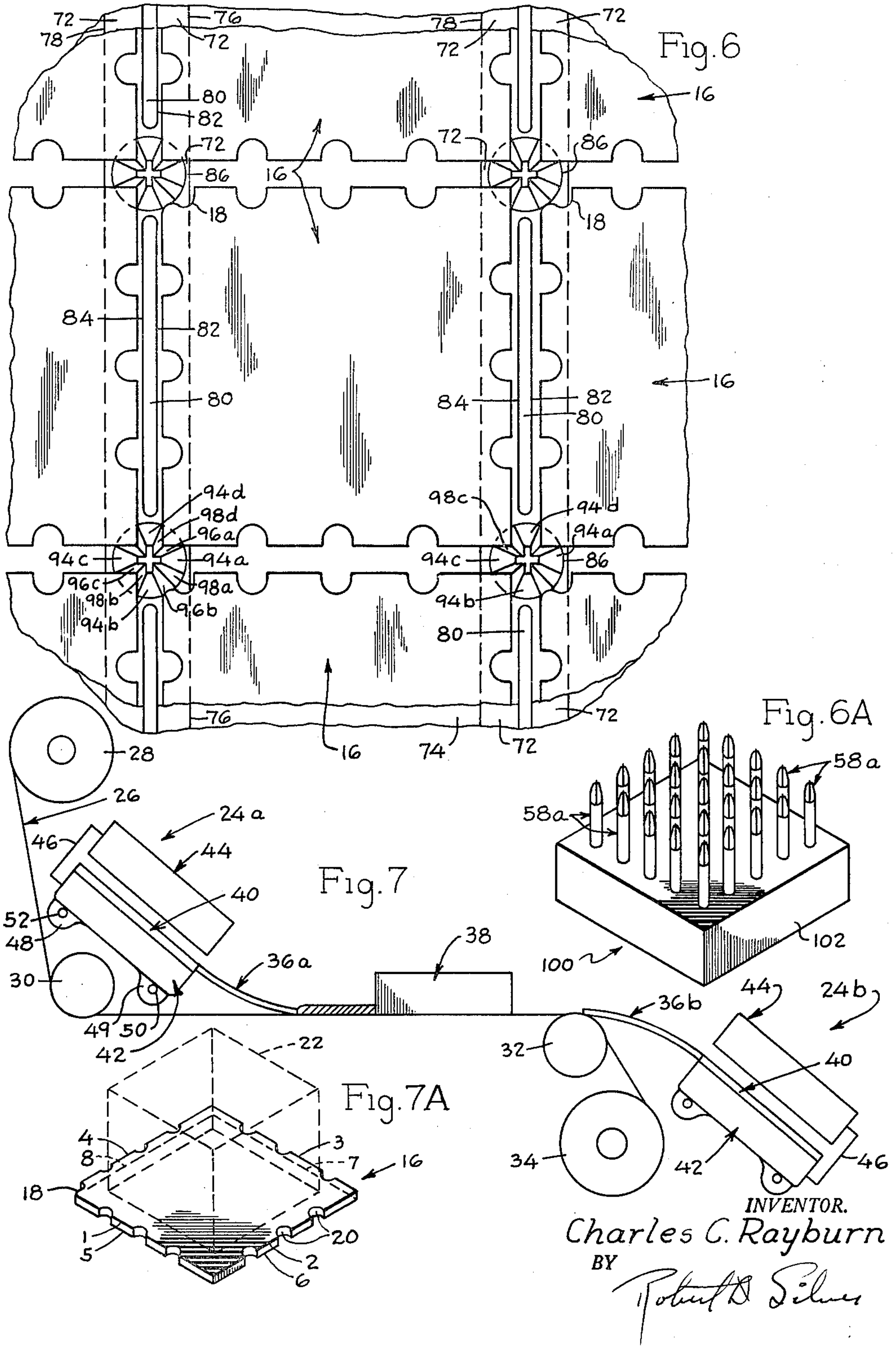
FIG. 6 is an enlarged fragmentary plan view similar to that shown in FIG. 4 portraying a portion of the magazine interior when one-half of the magazine is mounted on pin means such as is shown in FIG. 6A, the magazine being loaded with wafer elements.
FIG. 6A is an isometric view of manipulation fixture means for association with the individual magazine means to permit reorientation of the wafers located within the magazine prior to discharge therefrom.
FIG. 7 is a semi-diagrammatic side elevational view of feeder loader apparatus for discharging wafer elements from a magazine means onto a conveyor, the wafer elements passing through a work or test station and then being reloaded into magazine means.
FIG. 7A is an isometric view of a waferlike element adapted to be handled by the magazine and apparatus shown in the other figures.

The method and apparatus about to be described is particularly useful for handling, storing, feeding, loading, and manipulation of waferlike elements 16 (see FIG. 7A). The elements 16 are generally square and have a side dimension in the neighborhood of .3 inch and a thickness dimenion in the neighborhood of .01 inch. For purposes of illustration, the apparatus and the wafers have been considerably magnified. Although the method and apparatus shall be discussed relative to these so-called micro-sized wafers, it is to be remembered that this is to be considered illustrative rather than limiting.

The individual wafers 16 may be formed with a corner orientation notch 18 and a plurality of peripheral riser wire notches 20. The flat surfaces of the wafer are well adapted for various printed circuitries leading to the riser wire notches 20. The notches 20 are pre-tinned during processing of the wafers for purposes of connecting to the riser wires (not shown). Various components 22 are often mounted on the wafers 16, the approximate limitations as to size of components being demonstrated semi-diagrammatically in FIG. 7A. It will be noted that the components 22 are mounted on the flat surfaces of the wafer either on the top or bottom or both and preferably do not extend directly to the riser wire notches but are spaced a slight distance inboard thereof.

With the various printed circuitries available to be placed on the faces of the wafer, and considering that a total of 66 circuits are possible on a single wafer connecting up to the 12 riser wire notches, the orientation of the wafer for processing and assembling becomes exceedingly important. There are eight possible orientations of the wafer which are shown by the numbers 1 through 8 in FIG. 7A, the numbers illustrating the orientation of the wafer relative to any fixed reference surface.

A combination feeder and loader mechanism is shown diagrammatically in FIG. 7 and comprises a feeding unit **24*a* and a loading unit 24*b*. The units 24 are substantially identical and are disposed in spaced reversed relationship at opposite ends of the apparatus. A conveyor tape means 26 is provided in the form of a thin film material in ribbon form. An example of suitable conveyor material is polyethylene terephthalate which is sold under the trade name "Mylar." The conveyor tape 26 may be stored on a suitable storage roll 28 and passes under an idler wheel 30 to a second spaced idler 32 for rewinding on a rewind roll 34. The wafers are fed from the feeder mechanism 24*a* down a fixed chute 36*a*. The conveyor 26 or the chute 36*a* transports the wafers to a work or test station shown diagrammatically at 38. The wafers are then moved to a loading chute 36*b* by the conveyor 26, the chute being associated with the loading mechanism 24*b*. The flow of wafers 16** will be from left to right as viewed in FIG. 7.

Magazine means 40 are associated with the loader feeder mechanisms **24*a* and 24*b*. The magazine means 40 are mounted at an angle to horizontal on the loader feeder bases 42 which serve as a carriage for the magazine means. The loader feeder mechanisms have a top portion 44 which is hingably mounted to the respective bases 42 by a suitable connecting means 46. The upper portion 44 of the loader feeder mechanisms 24*a* and 24*b* may be pivoted on connecting means 46 for easy access to the magazine means 40**.

The loader feeder bases 42 are formed with two spaced coextensive lug means 48 and 49, which are adapted to ride on guide rods 50 and 52. Guide rods 50 and 52 are fixedly mounted relative to the remainder of the apparatus (not shown) and are adapted to provide precise sliding movement of the loader feeder units 24 thereon. Actuator means 54, here shown diagrammatically, has an extension 56 engaging the loader feeder units **24*a* and 24*b* and is adapted to move the loader feeder units 24*a* and 24*b* on the guide rods 50 and 52** to precisely indexed positions therealong.

The base 42 of the loader feeder units has a plurality of article controlling means in the form of pin means 58 which are adapted to project through the magazine base as shall be more particularly described. The pin means 58 are movable between article engaging and disengaging positions by suitable individual actuator means 60, here shown as solenoids, or by pneumatic actuators as suitable and desired. Means for controlling the actuators 60 of the pins 58 are provided by photocell means 62*a* and 62*b*, which are in circuit wtih the solenoid means 60. Before describing the detailed operation of the loader feeder mechanism, a detailed explanation of the make-up of the magazine means 40 will be described.

The magazine means 40 is composed of two modular one piece molded plastic identical members 64 and 66 which are nested together in interfitting right angular mirror image relationship. (See FIG. 1.) The magazines shown in the drawings are to be considered illustrative rather than as being drawn to scale. Further, the magazines shown are only adapted to hold 16 wafers, whereas in practice the magazine will be constructed of dimension such that it will hold in the neighborhood of 400 to 900 wafers. The major pictorial distortion that occurs in the drawings is the relative relationship of the thickness of the magazine members relative to their side (width and length) dimensions.

The magazine members 64 and 66 can each retain and discharge a plurality of wafer elements and are formed with a substantially square base 68 which has a plurality of trough means or tracks 70 which extend through opposite sides of the base members. Trough means 70 are identical and they are disposed in parallel relation across the top portion of the base 68 as shown. A plurality of spaced projecting portions 77 are provided on one side of each member and define the extent of the trough means extending therebetween. Each trough means 70 has a pair of parallel co-planar spaced articles supporting surfaces 72 extending from adjacent projecting portions 77 which form a track for the wafers 16. The articles supporting surfaces 72 are spaced from each other by a relatively deep channel like groove which is U-shaped in cross-section and which is co-extensive with the trough means 70. The groove has a base 74 and opposed side walls 76 and 78 which are spaced apart a dimension ($a$) which is less than the side dimension of a wafer 16 (see FIGS. 3, 4, and 6).

A series of projecting lugs 80 having a length dimension $b$ (see FIG. 4) and a thickness $t$ present opposed side surfaces 82 and 84 which form article confining surfaces for the articles 16. The surfaces 82 and 84 are generally parallel with the troughs 70 and generally transverse to the article supporting surfaces 72. The individual lugs 80 are symmetrically arranged in the magazine and provide the side edge guide surfaces for the wafers for movement along the track or trough 70. The lugs 80 on opposite sides of an individual track are spaced apart a dimension $w$ which is slightly larger than the side dimension of the square wafer 16. The relative dimensional relationships shown in FIG. 6 represent approximately a ten times size enlargement. It will be noted that the length $b$ of the individual lugs 80 is smaller than the side dimension of a wafer 16 and the space or interruption between adjacent lugs 80 in a series of lugs is also less than the side dimension of a wafer 16.

A plurality of through apertures 86 are provided and extend transversely through the base 68 into the area of the interruptions between adjacent lugs 80. The individual apertures 86 have a diameter larger than the thickness $t$ of the individual lugs 80 to receive the pin means 58.

A plurality of sensing apertures 88 are also formed transversely through the base 68 and are symmetrically arranged (in plan view) between the apertures 86. The apertures 88 are preferably aligned with the center line of the troughs 70 and at the mid point of diagonal intersection lines between four apertures 86 arranged as a square in plan view. There is one aperture 88 for each individual wafer 16 to be held within the magazine as shall become apparent.

In designing a magazine member half for optimum relationships, the following formulas and configurations are desirable. The magazine member is provided with a width or length side dimension $s$ which is equal to $n(a+2c)+t(n+1)+2m$; $n$ is equal to $$\frac{s-2m-t}{a+2c+t} \text{ or } \frac{s-2m-t}{w+t}$$

and $n^2$ equals the number of parts held by the magazine; $w$ is equal to the dimension between surfaces 82 and 84 disposed on opposite sides of a track 70 which can also be defined by the formula $(a+2c)$ wherein $a$ is the dimension of a channel portion over which wafer-like parts suspend and $c$ equals the dimension of an article supporting surface 72 extending from article confining surfaces 82, 84 on opposite sides of a channel portion; $t$ is equal to the thickness of the projecting lugs 80; $m$ is equal to the marginal area surrounding the trough necessary to provide structural strength for the magazine and provide space for the cooperating corner lugs and grooves 104 and 106 to be described; there are $n$ number of troughs 70 provided in the magazine and the magazine is symmetrical. The dimension $w$ is determined by measurement of the side dimensions of the article 16 to be confined and providing a slight sufficient additional dimension to afford ready movement of the article on the trough 70. If the dimension $w$ is in the neighborhood of .310 inch and the dimension $t$ is in the neighborhood of .023 inch (this being the generally appropriate dimensions for compartments for wafers of the size aforementioned), then a magazine having an $s$ dimension of seven inches will hold approximately four hundred wafers in planar array.

To load a magazine means 40, a magazine half such as 68 is placed in an appropriate loading mechanism such as 24*b* and is inclined at an angle to horizontal. The troughs 70 are aligned with the feed chute 36*b* and the actuator 54 aligns the apparatus 24*b* so that the first trough is in alignment with the chute. Note: While this apparatus shall be described as using a single source fixed in-put chute for feeding, it is equally well adapted to multiple source feeding and where larger magazines are used multiple source feeding under certain circumstances is preferred. It will be realized that the other input chutes will be parallel to chute 36*b* but are not shown. The same approach applies to the feeding operation.

The loader base 42 is positioned with the pin means 58 associated therewith disposed in a retracted position so that they do not project above surface 72 of the magazine. For purposes of illustration, consider the magazine in FIGS. 1 and 1A as being the magazine in the feeder unit with the lowermost portion of the magazine of the drawings being the lowermost portion of the magazine half in the feeder unit 24*b* with the feedin trough 36*b* being located adjacent to the first trough and at the other end thereof. To start the feeding operation a pin means 58 is projected into the aperture 86' and a wafer is released into the trough from the chute 36*b*. When the pin means 58 projects through aperture 86' it presents a surface at right angles to surface 72 which will stop and retain a wafer on the track and aligned between projecting lugs 80.

Figures 1, 1A, 2, 3, 4, 5:
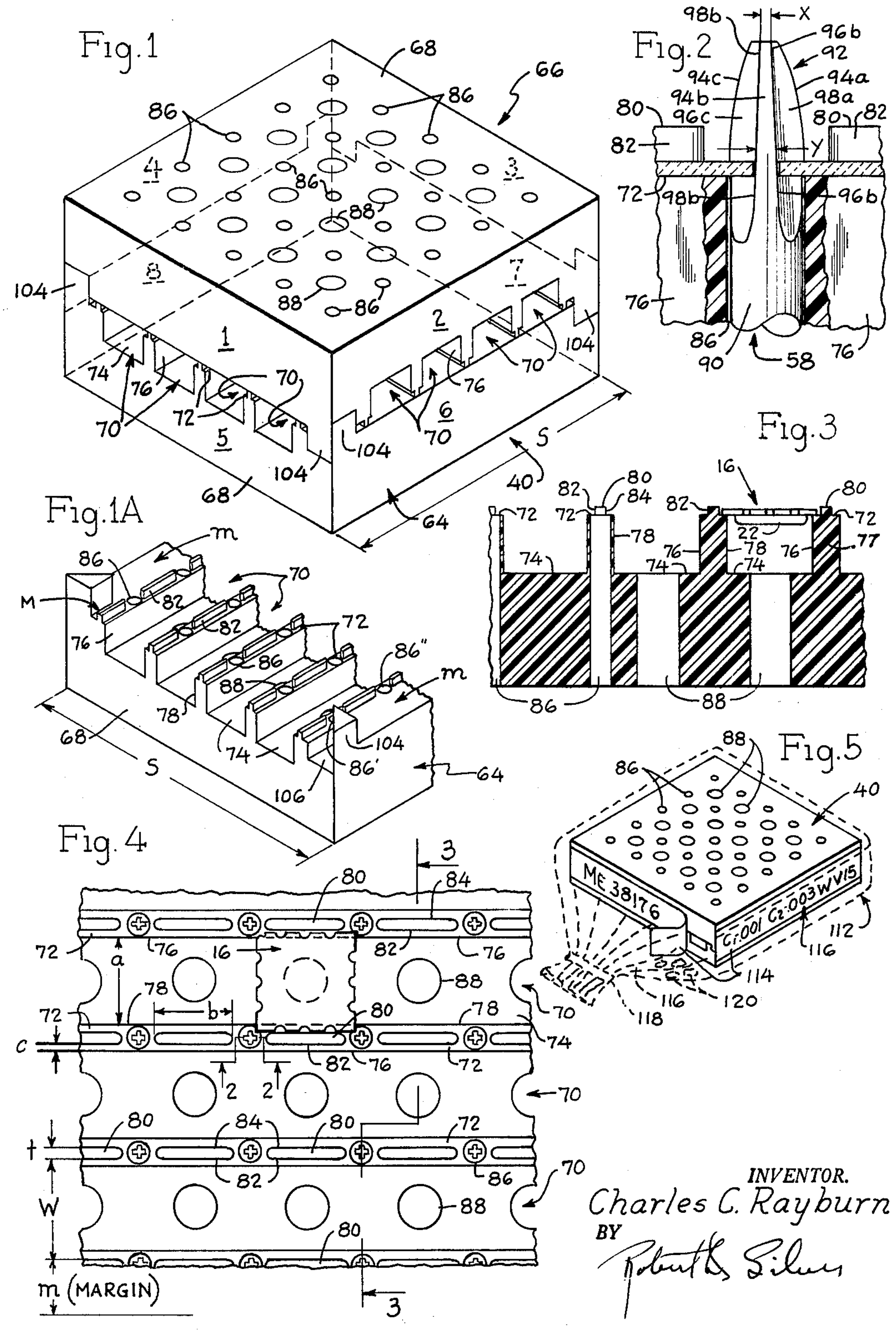
FIG. 1 is an isometric view of a magazine composed of two identical members arranged in mirror image right angular relationship.
FIG. 1A is a partial isometric view of the lower half member of the magazine shown in FIG. 1.
FIG. 2 is an enlarged fragmentary partial sectional view taken along lines 2—2 of FIG. 4 with a pin shown in extended position.
FIG. 3 is a partial section view taken along lines 3—3 of FIG. 4 with no pins shown.
FIG. 4 is an enlarged fragmentary plan view of the interior portion of one-half of the magazine shown in FIG. 1, the location of pins being shown diagrammatically by crosses.
FIG. 5 is an isometric perspective view of a magazine packaged for shipment.

As can be best perceived in FIGS. 2 and 6, the pin means 58 have a generally cylindrical portion 90 and a configured entering in portion 92. The entering end 92 is of generally cruciform shape having four radially projecting bosses 94*a* through 94*d*. Each individual boss 94 presents oppositely disposed generally axially aligned surfaces 96*a* through 96*d* and 98*a* through 98*d*. While the surfaces 96*a* and 98*a* are generally axially aligned, they are tapered or angularly offset from true alignment with the axis so that the dimension between the boss surfaces 96 and 98 have a dimension $x$ adjacent to the entering end and a wider dimension $y$ intermediate the axial length of the boss. Dimension $x$ is less than the dimension $t$ (the thickness of projecting lug 80) and dimension $y$ is greater than the thickness $t$ of boss 80. As best shown in FIG. 2 the individual bosses 94a through 94d increase progressively in size from the entering end and flow smoothly into cylindrical portion 90 as the grooves defined by surfaces 96 and 98 constantly become shallower.

Thus as the first wafer is loaded onto the track or trough means 70, due to the inclination of the magazine half, the wafer will move down along the track until it engages the projecting surface such as 96 or 98 on one of the bosses 94 of the pin means 58 in the aperture 86'. It will be noted that the pin means have two of the bosses 94 symmetrically aligned with the lugs 80 and the other two bosses at right angles thereto. If the aperture in the lower right hand corner of FIG. 6 is considered to be pin aperture 86'; then surface 98c will engage and would retain the wafer 16 in the alignment shown relative to the lugs 80.

The opposed photo sensitive means 62a and 62b located in the respective apparatus portions 42 and 44 in alignment with the wafer located on the pin in aperture 86' will have the light rays therebetween interrupted by the presence of the wafer 16. The interruption of the light rays is arranged through the circuit connecting the photo sensitive means and pin aligned with aperture 86'', to cause the pin to be projected upwardly for automatically positioning the next wafer and so on until the entire first trough 70 is filled. After the first trough is filled, the indexing mechanism 54, through appropriate control means, then causes the mechanism 24b to be shifted so as to align the second trough with the feeding chute 36b and the next trough would be filled in the same manner.

It will be noted that the pins 58 have symmetrical entering ends 92 and the pins 58 are projected relative to the entering ends so that the portion of the boss 94 having a thickness *y* is projected slightly above the surface 72. Thus, adjacent wafers of a series of wafers on any individual track are spaced apart a dimension slightly greater than dimension *t*. It will also be noted that an identical spacing between wafers obtains transversely to the track or trough means 70 due to the symmetrical configuration of the bosses on entering end 92 of the pins. The loading operation continues until the magazine member is completely loaded, but the spacing between individual wafers is still maintained by the pins. At this juncture the upper half 44 of the loader mechanism 24b is pivoted away from the magazine half. An identical magazine half such as 66 is placed over the filled lower magazine half 64, the upper half 66 being rotated 90° and inverted 180° from the position of the lower half so that the two halves will nest together in interfitting interlocking mirror image right angle relationship. The projecting pins 58, by the extent of the entering end 92 above the lugs 80 provides orientation of apertures 86 in the upper magazine half so that exact nested relationship is obtained. Due to the relative dimensions as heretofore discussed, the lugs 80 on the upper magazine half member 66 fit into the area between adjacent wafers aligned on a track 70, the surfaces 82 and 84 providing confinement for the wafers to prevent movement along the tracks 70 in the lower magazine member 64. The opposite relationship obtains relative to lugs 80 on member 64 and tracks 70 on member 66.

The corners of the individual magazine halves 64–66 are formed with complementary projecting lugs 104 and grooves 106 which permit interlocking nested relationship. Once the upper half is placed on the lower half an individual compartment is formed for each individual wafer 16 and each wafer is maintained separate from its neighboring wafers. Due to the interlocking relationship of the lugs 104 and grooves 106, relative movement of the two halves 64 and 66 can take place on only one axis.

The relative height of lugs 104 and depth of grooves 106 determines the spacing between surfaces 72 on opposed magazine halves 64 and 66. An alternate method of determining the height between opposed surfaces 72 so that crushing of the individual wafers between said opposed surfaces 72 (disposed at right angles to each other when the members 64 and 66 are nested together) is provided by the marginal area *m* on the magazines. The marginal area *m* can be varied to suit, and can perform the function of providing the desired spacing between the angularly disposed surfaces 72. The four marginal areas *m* on each of the magazine halves 64 and 66 as shown are in only one of many possible configurations which is intended to be considered illustrative rather than limiting.

To prevent accidental disengagement of the magazine halves 64–66 when they are trapping wafers therebetween, tape means 114 is placed peripherally around the side edges of the magazine to make a magazine package 112. Indicia means 114 located on the tape means preferably sets forth the nature of the contents of the magazine as well as setting forth the relative orientation of the wafers within the magazine. For transporting purposes and for storage purposes the magazine package 112 is preferably encapsulated within a thin transparent bag 116 made out of a suitable plastic film. The bag 116 is sealed as shown diagrammatically at 118 and contains some vapor pressure producing pellets 120 which will cause a positive vapor pressure and provide a contamination free atmosphere within the package. One example of a suitable pellet is a naphthalene pellet.

It is often desirable that a loaded magazine means 40 discharge the wafers in a different orientation from that in which they were fed. This may be due to a desire to place additional circuitry on the wafers, to perform additional tests on various circuits already superimposed upon the wafers, for assembling the wafers into modular groups or for other diverse reasons. The instant magazine means 40 permits manipulation of the magazine halves such that the wafers may be discharged therefrom in any one of their eight orientations. The eight orientations of the wafer (Nos. 1–8 shown in FIG. 7) correspond with the numbers 1 through 8 on the magazine means 40 shown in FIG. 1. The discharge of the wafers in a different orientation from that in which they were fed into the magazine is accomplished even though the wafers may have relatively bulky components 22 mounted on the top or bottom side thereof since the channels defined by the base portion 74 and side portions 76 and 78 will accommodate rather bulky components on the wafers. It will be further noted that the mounted components need not be identical and the wafers need not have components mounted thereon. This versatility in handling diverse wafers having certain uniform dimensions is particularly desirable.

To discharge the wafers from other than their original orientation, it is relatively easy to get four orientations from the magazine by simply inclining the troughs 70, depending upon which magazine half is down, so that four discharge positions are provided. Using the magazine shown in FIG. 1 for illustration, discharge out of the trough 70 from orientation position 5 merely requires the insertion of the magazine in the feeder mechanism 24a with side 5 of the lower half of the magazine 64 disposed adjacent to the chute 36a. Discharge of the wafers in orientation 7 is obtained by merely rotating the magazine 180°. By inverting the magazine and appropriately rotating same, the orientations 2 and 4 are easily provided.

To provide the remaining four orientations, a fixture such as shown in FIG. 6A identified by the reference numeral 100, is useful. Fixture 100 essentially comprises a base 102 with a plurality of fixed pin means 58a which are similar to pins 58 except that they are fixed rather than movable. The pins extend above the base 102 so that that when a magazine member half is set on the pins, the pins will project through the base 68 the distance shown in FIG. 2. To provide the other four orientations, the following manipulations may be performed: the lower half of the magazine 68 is fitted over the fixture 100 so that the wafer articles rest on the pins 58*a*; the upper magazine member 66 is then removed and placed on an identical fixture member to fixture 100, the upper half member is then rotated 90° from the initial orientation shown in FIG. 1 such that the tracks 70 are in alignment on both halves 64 and 66; both fixtures and magazine halves are then inverted and the former lower half 64 and its associated fixture are removed to provide orientations 1 and 3; to provide orientations 6 and 8 the lower half is replaced in interlocking nested relationship with the former upper half and the new orientations are provided.

Figure 8:
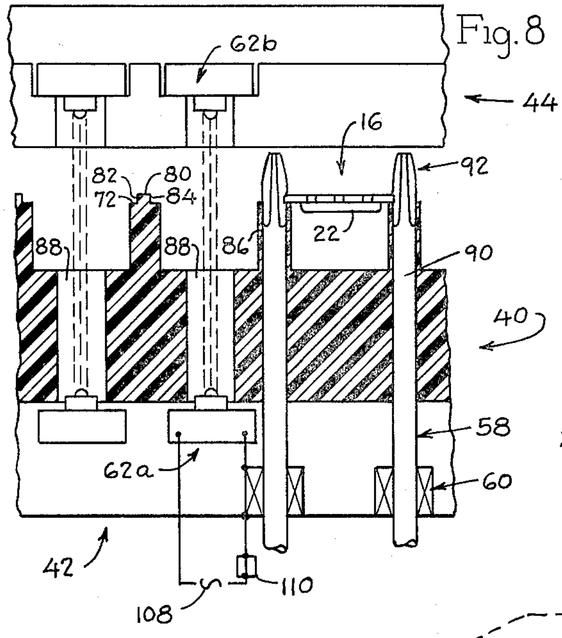
FIG. 8 is a fractional sectional view taken along lines 8—8 of FIG. 8A.
Figure 8A:
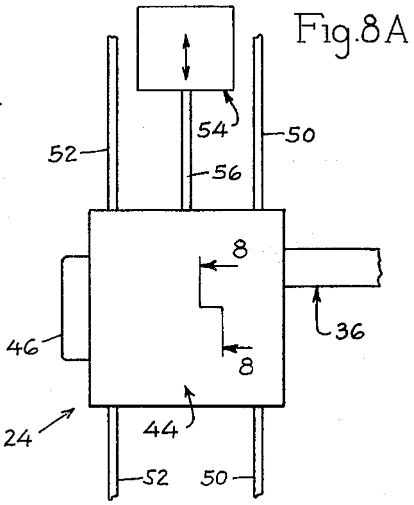
FIG. 8A is a plan view of a component of the loader feeder mechanism shown at each end of the apparatus in FIG. 7.

When the desired discharge orientation is decided upon for discharge of wafers from the magazine, the magazine is placed on a feeder mechanism 24*a* for discharge of the wafer onto fixed chute 36*a*. The troughs 70 that are desired to be discharged are aligned with the chute 36*a* and the reverse operation from the feeding operation takes place. In discharging the wafers 16 from the magazine, the pins 58 in the lower portion 42 of the feeder apparatue are initially disposed in article retaining position as shown in FIG. 8. By sensing the absence of the next preceding wafer on a trough 70 through the photo cell means 62*a*–62*b*, the pins are automatically withdrawn by actuating the solenoid means 60 which is in circuit with a source 108 and with the associated photo cell means 62*a* and 62*b*. Various control means 110 can be associated with the circuit to insure a correctly programmed operation and the operation is well adapted to be automatically programmed by a tape. However, since the control means 110 by itself is not part of the present invention, it is to be understood that the invention need not, therefore, be limited to a programmed operation although it is well adapted for such a use and can be connected to the pin solenoid circuit as indicated in FIGURE 8. As will be readily perceived, all, or only some of the wafers may be discharged from the magazine, the magazine may then be removed, stored and later replaced with no loss of individual identity of the components within the magazine. Further, if desired, different components may be stored in the same magazine and may be individually handled as suitable and desired.

Figures 9, 10, 11:
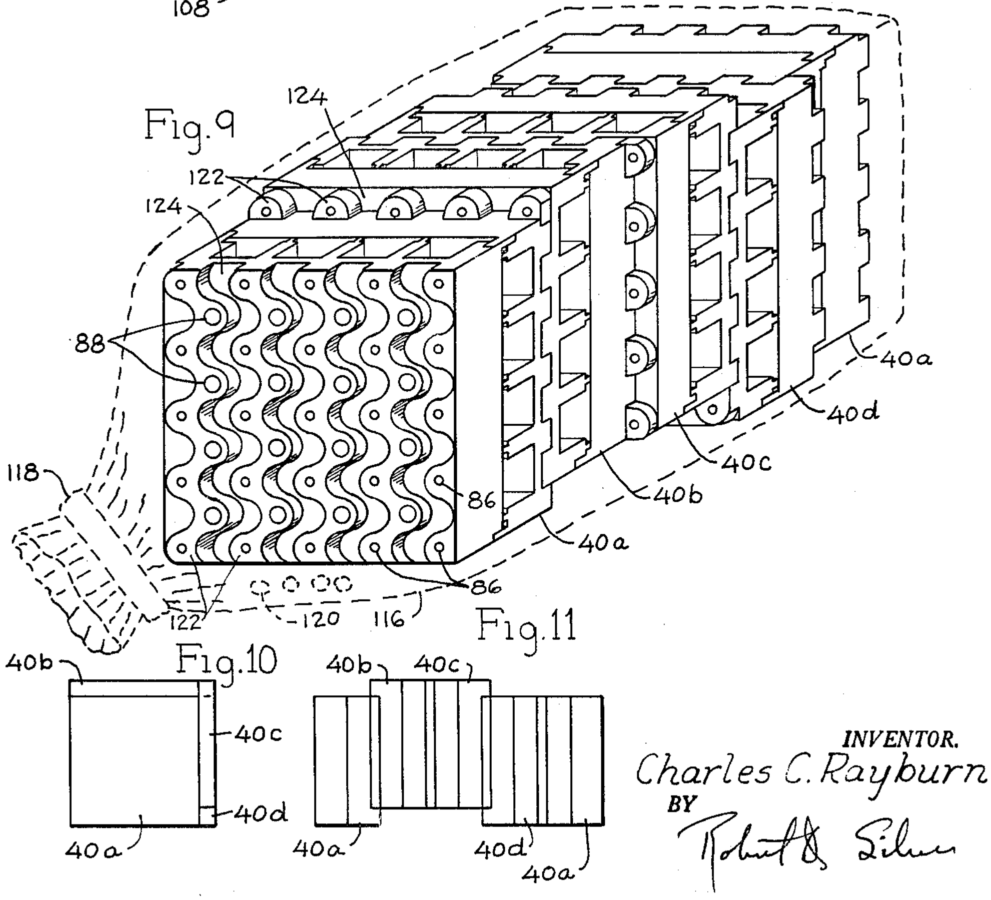
FIG. 9 is an isometric view of an alternate form of magazine showing a plurality of magazines packaged together in interlocking nested relationship.
FIG. 10 is a semi-diagrammatic outlined view of the magazines shown in FIG. 9, said magazines being shown in front elevational view.
FIG. 11 is a semi-diagrammatic side elevational view of the magazines shown in FIGS. 9 and 10.

The magazines shown in FIGS. 9, 10, and 11 are substantially similar to those shown heretofore and only the differences shall be discussed. As aforementioned, relative to the earlier figures, the magazine means 40*a*–40*d* shown in FIGS. 9, 10, and 11 are considerably distorted from actual size in that the thickness dimensions is normally in the neighborhood of 1″ and the side dimension is in the neighborhood of 7″. Thus, the completed magazine has an overall configuration of being rectilinear 7″ to a side with a 1″ total thickness dimension. To reduce the overall packing dimension of a shipment of a plurality of magazines, it is desirable to reduce the net effect of the thickness dimension of 1″ of the magazine. To provide this functioin, a plurality of symmetrical sinusoidal grooves and ridges 122 and 124 traverse the large faces of the magazine means as shown. The ridges 122 serve the functions of providing an interlocking relationship between adjacent magazines in a stack of magazines and further provide a strengthening rib which permits minimal dimensions and amounts of material needed in the molded magazine halves. Due to the sinusoidal configuration of the ridges, the magazine maintains its strength in all directions. The complementary grooves 124 permit a reduction in the total length of a stack of magazines. The ridges and grooves are preferably arranged as shown such that the apertures 86 and 88 are coplanar and preferably are formed through the ridges 122 for purposes of strength. Further, due to the nature of photo cells being light responsive, it is desirable that the furthest extending faces of the magazine halves be adapted to have the sensing apertures 88 therein so that stray light will not interfere with the operation thereof. By the relationships shown in FIG. 9, the magazine halves will interfit together so that each successive magazine is offset from the next preceding magazine by one half a wave form of the sinusoidal ridges and grooves. In a 7″ side dimension magazine, the offset will be in the neighborhood of a ⅙″ projection, the magazine 40*b* projecting above magazine 40*a* by ⅙″, the magazine 40*c* projecting sideways (as viewed in FIG. 10) ⅙″ relative to magazine 40*b*, the magazine 40*d* projecting downwardly relative to magazine 40*c* ⅙″, and being offset from the next adjacent magazine 40*a* ⅙″. The series repeats itself every fifth magazine in a stack of magazines. The small volume increment in upward and sideward extent of the adjacent magazines is over-shadowed by the overall reduction in stack length. Further, the nested magazine will not shift relative to one another. A single packing container may be used such as a single bag 116 to enclose the entire group of magazines.

From the foregoing, it can be seen that a method and apparatus has been described where one basic loader feeder unit will load in a magazine from a fixed chute or unload the magazine into a fixed chute. The magazine consists of two molded plastic members which are identical. The magazine members nest in each other when their guide rails or lugs 80 are at right angles. The bosses and corresponding grooves in the magazine corners cause them to nest precisely in register. Means is provided to cause an interfitting nested relationship of a plurality of magazines.

The position pins 58 on the loader feeder units position the microelements 16 in the magazine when the magazine is placed on the loader feeder. When the magazine is being a feeder, then the position pins are normally extended and the position pins become escapements, which escape the wafer elements 16 out of the row which is aligned with the output chute. The escapement and loading from and to the magazine is indexed and programmed by the photo cells in alignment with elements 16 on the loader feeder.

If it is necessary to cease running a certain operation when the magazine is partially empty, the top half of the magazine may be re-installed and the parts 16 can be stored away in an oriented manner. It will be noted that as the guide pins 58 start through the magazine, they cannot interfere with the micro-elements except to cam them into exact position such that they are clear of the guide rails or lugs 80. It is this clearance which makes possible the manipulation of the magazine halves.

The magazine is readily held together during shipment and storage by a band of tape which serves to identify the micro-elements 16 therein, their value or values, the terminal arrangements, and orientation thereof, all by preprinting this information on the tape. With the magazines stacked in a group, the tape, being on the magazine edge, makes visual identification easy and positive. If pieces are removed from the magazine, the remaining count can be easily maintained on the tape as a perpetual inventory. Further, due to the orientation notches 18 in the micro-element wafers 16, a visual check on the orientation of the individual wafer members may be had by viewing through the apertures 86 in the closed magazine. This is particularly helpful when the storage means for the magazines are located at some distance from a loader feeder mechanism or a manipulating mechanism.

Although specific embodiments have been shown and described, it is with full awareness that many modifications thereof are possible. The invention, therefore, is not to be restricted except by the spirit of the appended claims.

What is claimed as the invention is:

1. A magazine for handling a plurality of articles of manufacture comprising first and second identical members, each member having spaced parallel projections on one face defining troughs therebetween, said projections being provided at their outer extremities with article supporting shoulders and aligned lugs forming trackways for said articles, said members being positioned in right angle mirror image relationship with said article supporting shoulders and said lugs cooperating to provide confined compartments in the vicinity of the outer extremities of said projections for the aligned retention of articles located therebetween, each of said troughs adapted to receive components mounted on said articles, and said members when separated from each other affording ready movement of each of the articles on its trackways.

2. Magazine means for handling a plurality of articles of manufacture, and comprising a plurality of identical magazines, each magazine including first and second identical members, each member having spaced parallel projections on one face defining troughs therebetween, said projections being provided at their outer extremities with article supporting shoulders and aligned lugs forming trackways for said articles, the members of a magazine being positioned in right angle mirror image relationship to each other with said article supporting shoulders and said lugs cooperating to provide confined compartments in the vicinity of the outer extremities of said projections for the aligned retention of articles located therebetween, each of said troughs adapted to receive components mounted on said articles, and the members of each magazine when separated from each other affording ready movement of each of the articles on its trackways, and each of said magazines presenting oppositely facing first and second surfaces with the first surface of each magazine traversed by a plurality of alternate grooves and ridges of complementary sinusoidal configuration, and with the second surface of each magazine having identical ridges and grooves in right angular relationship to said grooves and ridges traversing the first surface of a corresponding magazine, the grooves and ridges of confronting surfaces of adjacent magazines extending in generally the same direction whereby the plurality of magazines are interlockingly arranged in stacked relationship with each alternate magazine in the series of magazines being offset from immediately adjacent magazines by interaction of the sinusoidal ridges and grooves.

References Cited by the Examiner

UNITED STATES PATENTS

| | | | |
|---|---|---|---|
| 702,388 | 6/02 | Wing | 221—68 X |
| 749,260 | 1/04 | Conner | 221—106 |
| 1,875,188 | 8/32 | Williams. | |
| 1,983,322 | 12/34 | Stewart. | |
| 2,300,956 | 11/42 | Mergens | 221—75 |
| 2,335,766 | 11/43 | Kinloch. | |
| 2,421,225 | 5/47 | Stensgaard. | |
| 2,570,059 | 10/51 | Hurxthal. | |
| 2,720,967 | 10/55 | Wilson. | |
| 2,770,392 | 11/56 | Roberts | 221—1 |
| 2,870,937 | 6/59 | Telly | 221—22 |
| 2,899,097 | 8/59 | Haskins. | |
| 2,906,385 | 9/59 | Groves. | |
| 2,949,184 | 8/60 | Lehner. | |
| 2,979,229 | 4/61 | Reeder et al. | 221—22 |
| 2,994,458 | 8/61 | Rise | 221—1 |
| 3,067,911 | 12/62 | Finley et al. | 221—106 X |
| 3,080,092 | 3/63 | Zdanis | 221—68 |

LOUIS J. DEMBO, *Primary Examiner.*

FRANKLIN T. GARRETT, KENNETH L. LEIMER, RAPHAEL M. LUPO, *Examiners.*